Aug. 23, 1960 H. C. GOODRICH 2,950,343

NOISE IMMUNE AMPLITUDE DISCRIMINATORY SYSTEM

Filed Jan. 26, 1955

INVENTOR
HUNTER C. GOODRICH
BY H. L. Newton
ATTORNEY

United States Patent Office 2,950,343
Patented Aug. 23, 1960

2,950,343

NOISE IMMUNE AMPLITUDE DISCRIMINATORY SYSTEM

Hunter C. Goodrich, Collingswood, N.J., assignor to Radio Corporation of America, a corporation of Delaware Filed Jan. 26, 1955, Ser. No. 484,232
13 Claims. (Cl. 178—7.3)

Figure 1:
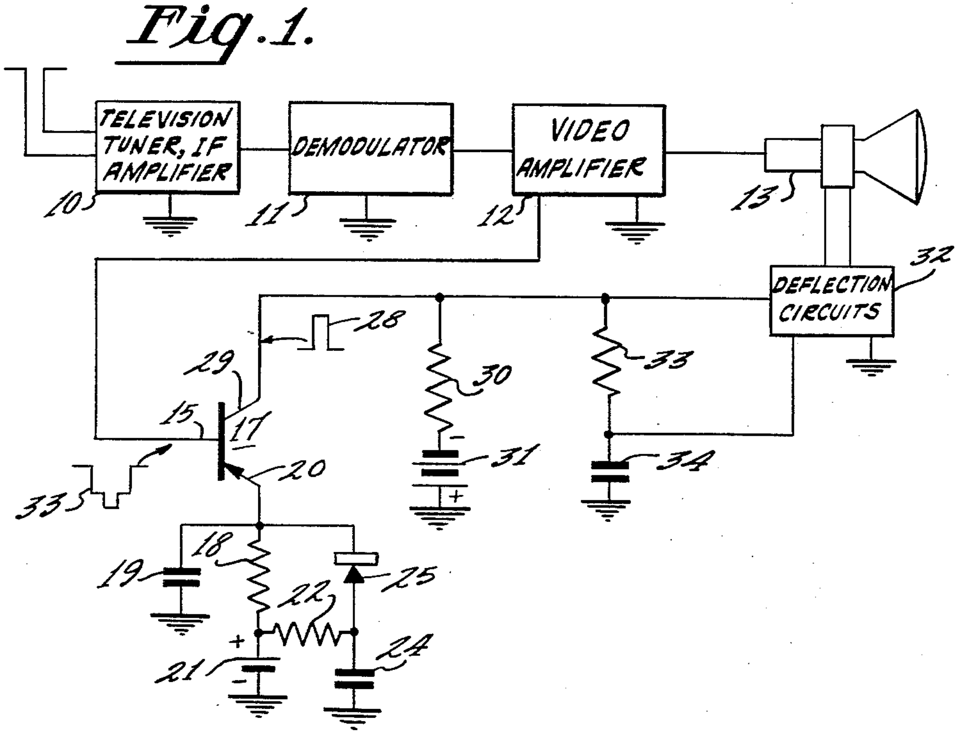

The present invention relates generally to amplitude discriminatory signal translating systems and particularly to such systems for providing signal translation of a predetermined portion of an amplitude modulated signal which may vary in average carrier wave level.

In electric signal processing systems, it is frequently required to separate a predetermined amplitude range of signal information from a given amplitude modulated signal. This is generally accomplished by permitting the translation of signal information having an amplitude in excess of a predetermined threshold by means of a threshold or gate circuit action and by preventing the translation of signal information having an amplitude in excess of a predetermined level by means of a limiting action.

Signal processing systems such as television receiving systems generally employ amplitude discriminatory circuits for the selection of synchronizing information from a composite signal. Such systems, however, are frequently subjected to signals of varying amplitude thus requiring adjustment of the threshold and limiting levels to prevent the translation of unwanted and ofttimes deleterious information. Since the composite signal comprises discrete components, it is desirable that the amplitude discriminatory system be responsive to more than one component for automatic adjustment of the threshold level and yet be effective to provide selective translation of a single component. It is, therefore, desirable to utilize both the vertical and horizontal synchronizing signal information to establish the threshold level thereby deriving the benefit of the complete synchronizing duty cycle to more accurately define the threshold with reference to the instantaneous signal level of the input signal.

The synchronizing ability of a television receiving system in the presence of impulse noise is a function of the noise characteristics of both the synchronizing and automatic gain control (AGC) circuits. One characteristic of a synchronizing separator circuit which aids noise immunity is the ability to clip off noise impulses so that they never exceed the level of the synchronizing signal output. Another very important factor is that the separator circuit not block or cut off for long periods of time following noise pulses. Impulse noise disturbances are normally of relatively short duration and low duty factor. The loss of synchronizing information during the actual noise pulses usually does little harm. If the separator circuit, however, has long time constants that can charge on the noise pulses to keep the separator cut off for a long time period thereafter, a serious loss of synchronizing information results.

A long separation time constant is necessary for the separation of vertical synchronizing information. If horizontal synchronizing signal information is taken from the same circuit the time constant must be on the order of 100 times that required for horizontal separation alone. This may seriously affect horizontal noise immunity.

In vacuum tube circuits it is possible to use a double time constant in the grid circuit of the synchronizing signal separator and to provide noise immunity by including a series resistor in the grid circuit selected to have a large resistance so as to limit the degree of charging possible in the large time constant circuit. The presence of this large series resistance does not seriously reduce the gain of a vacuum tube circuit to vertical synchronizing information because of the very high input resistance of the vacuum tube. The low input resistance of a transistor amplifier, however, precludes the use of such a circuit due to the very large reduction in signal gain which would be produced.

It is, accordingly, an object of the present invention to provide a noise immune amplitude discriminatory system which effectively may utilize semiconductor devices.

It is a further object of the present invention to provide a noise immune amplitude discriminatory signal translating system which may effectively employ a semiconductor device to selectively and exclusively translate a pair of input signals occurring at different recurrent rates.

It is another object of the present invention to provide an improved synchronizing signal processing circuit for television receiving systems wherein synchronizing signal information is effectively selected from an applied video signal and thereafter limited to reduce the effects of extraneous noise signal components extending beyond the amplitude of the synchronizing beat.

It is still another object of the present invention to provide an improved synchronizing signal processing circuit for television receiving systems wherein horizontal and vertical synchronizing signal information is effectively selected from an applied video signal without undue interaction therebetween and with a minimum effect of extraneous noise signal components.

In accordance with the present invention, a single channel double clipping synchronizing signal separator circuit employs a semiconductor device having a double time constant network in the emitter-base electrode circuit. A unilaterally conducting device is utilized to connect the short time constant network in the circuit at such time to repair the circuit for immediate response to signals of a horizontal synchronizing rate without impairing the operation of the circuit in translating signals of the vertical synchronizing rate.

Figure 2:
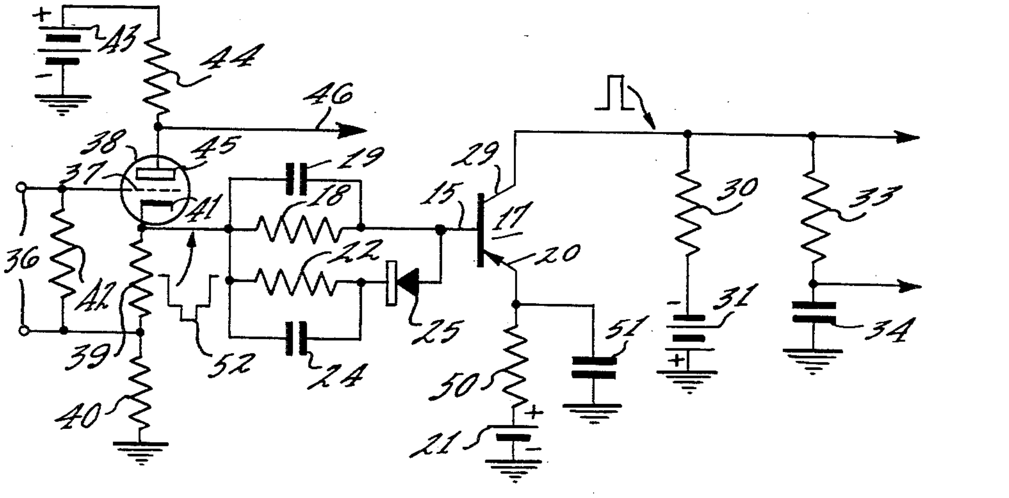

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic circuit diagram, partly in block form, of a television receiving system incorporating an amplitude discriminatory system in accordance with the present invention; and Figure 2 is a schematic circuit diagram of a further embodiment of an amplitude discriminatory system in accordance with the present invention.

Referring now to the drawing wherein like reference characters are utilized to designate like elements throughout the various figures, and referring particularly to Figure 1, a conventional television receiving system is provided for receiving and demodulating a transmitted television carrier wave. The system may comprise, as the legend indicates, a television tuner and intermediate frequency signal amplifier portion 10 for initially processing the received carrier wave and a demodulator portion 11 whereby the composite video signal is recovered from the carrier wave. The composite video signal is coupled in the usual manner to a conventional video signal amplifier 12 which is provided for further amplification of the video signal and which is coupled with a kinescope 13 to develop an image of the televised object.

The composite video signal will be understood to include horizontal and vertical synchronizing pulses superimposed at predetermined intervals upon the blanking pulses for maintaining synchronous operation of the receiver deflection apparatus with that of the transmitter. Accordingly, an output signal is derived from the video amplifier 12 and applied to the base electrode 15 of a semiconductor device illustrated as a junction transistor 17 of the PNP variety and utilized in a synchronizing signal separator circuit.

In accordance with the present invention, a time constant network having a relatively short time constant which is long compared to the horizontal period of synchronizing signal information comprises the parallel arrangement of a resistor 18 and a capacitor 19 connected between the emitter electrode 20 and the positive terminal of a source of energizing current illustrated as a battery 21. The negative terminal of the battery 21 is connected to a point of fixed reference potential such as signal ground.

Further, in accordance with the present invention, a second time constant circuit which provides a relatively long time constant and one which is long when compared with the vertical synchronizing signal period, comprises the series arrangement of a resistor 22 of a capacitor 24 connected in shunt with the battery 21. A unilaterally conducting device illustrated as a diode is connected between the emitter electrode 20 and the junction of the resistor 22 and the capacitor 24 to provide switching of the long time constant network in accordance with the present invention in order to maximize the operation of the circuit for horizontal signal separation and to immunize the circuit against impulse noise.

Synchronizing signals which are represented in simplified form by the wave form 28 are derived from the collector electrode 29 by means of a load impedance element illustrated as a resistor 30 connected in series with a second source of direct current energizing potential illustrated as a battery 31 between the collector electrode and signal ground. Synchronizing information of a horizontal rate is applied from the collector electrode to the deflection circuits 32 of the television receiving system and synchronizing signal information of a vertical rate is integrated by the integrating network comprising the series arrangement of a resistor 33 and a capacitor 34 which are connected between the collector electrode and signal ground. Accordingly, the vertical synchronizing pulses are derived from the junction of the resistor 33 and the capacitor 34 and applied to deflection circuits 32 in order to insure synchronous operation with the deflection circuits of the transmitting equipment.

It may now be seen that in operation the direct current bias conditions for the transistor 17 are such as to provide conduction and signal translation only during the application of negative going input signals to the base electrode 15. These negative going input singals are derived from the video amplifier 12 and are normally a train of pulses including horizontal and vertical synchronizing pulses as illustrated by the wave form 33. This input information may also include noise pulses having excessive amplitude.

During the application of input signal energy to the base electrode 15 the emitter electrode current flow through the emitter resistor 18 develops a voltage drop of such a polarity to bias the diode 25 in a forward direction thereby closing the diode. This allows the capacitor 24 to charge during synchronizing pulses and maintains the emitter bias at the appropriate level during vertical synchronizing pulses to insure proper separation thereof. It may readily be seen that noise pulses also provide the forward bias across the diode 25 which affect a charge of the capacitor 24 only during their application to the base electrode 15.

Upon the termination of a synchronizing or noise pulse however, the forward bias across the diode 25 is reduced and a bias in a reverse direction is developed by the discharge of the capacitor 24 through the resistor 22 and the battery 21. This effectively causes the diode 25 to open thereby isolating the emitter electrode 20 from the capacitor 24.

The bias then existing between the emitter electrode 20 and the base electrode 15 is determined by the fast time constant network comprising the capacitor 19 and the resistor 18 which are of appropriate magnitude to repair the circuit condition for the proper separation of horizontal synchronizing pulses.

Since the capacitor 24 is effectively connected to the emitter electrode 20 only during the existence of input signal information to the base electrode 15, whether that signal information be the desirable signal information relating to vertical and horizontal synchronization or whether it be impulse noise, it is readily seen that the bias conditions applied to the emitter electrode 20 are effective to provide proper separation of both horizontal and vertical synchronizing pulses by establishing an appropriate threshold bias which is determined by the average of the input signal level. Impulse noise information may effect the operation of the circuit only during the presence of the impulse noise since any excess charge which is developed on the capacitor 24 is not effective as a continuing bias on the emitter electrode upon the termination of such pulses.

Accordingly, the horizontal and vertical synchronizing pulses which may be derived from the collector electrode 29 are properly separated due to the establishment of an appropriate threshold bias level and are clipped in amplitude due to the saturation of the collector electrode 29. The maximum amplitude of the synchronizing pulses which are accordingly applied to the deflection circuits 32 is substantially that provided by the battery 31.

The double time constant network as provided in accordance with the present invention to establish noise immunity in the synchronizing signal separating circuits may also be utilized in series with the input or base electrode of the transistor as illustrated in Figure 2. Input signals from any convenient source such as, for example, the demodulator 11 of Figure 1 may be applied to a pair of input terminals 36 one of which is connected to the control electrode or grid 37 of an electron discharge device 38 the other of which is connected to the junction of a pair of cathode resistors 39 and 40 which are connected in series relation between the cathode 41 and signal ground. A direct current bias to establish the operation point of the electron discharge device 38 is provided by means of a grid resistor 42 which is connected between the control grid 37 and the junction of the cathode resistors 39 and 40. Direct current energizing potential is provided for the electron discharge device 38 from a source of direct current voltage illustrated as a battery 43 connected in series with an anode load resistor 44 between signal ground and the anode 45. If, in the present example, the electron discharge device 38 is utilized as a video amplifier the video signal may be derived from an anode 45 as indicated by the signal lead 46 connected thereto.

The composite video signal which includes the vertical and horizontal synchronizing information may be derived from the cathode 41 and applied to the base electrode 15 through the double time constant network as provided in accordance with the present invention. As above discussed in connection with Figure 1, the first time constant network includes a resistor 18 and a parallel connected capacitor 19 which are chosen to provide a relatively fast time constant which is responsive to signals of the horizontal synchronizing rate. The relatively long time constant network which is selected to be responsive to signals of the vertical synchronizing rate includes the parallel arrangement of a resistor 22 and the capacitor 24. The long time constant network is connected in series with a unilaterally conducting device or diode 25 in shunt with the relatively fast time constant network. A direct current bias is applied to the emitter electrode 20 by means of the battery 21 and the emitter resistor 50 which are connected in series arrangement between the emitter electrode 20 and signal ground. A capacitor 51 is connected in shunt with the series arrangement of the emitter resistor 50 and the battery 21 to provide a time constant of appropriate length to determine the average bias on the emitter electrode in accordance with the average signal level applied to the base electrode 15.

Both vertical and horizontal synchronizing signals are derived from the collector electrode 29 and may be applied to a suitable apparatus such as the deflection circuits 32 illustrated in Figure 1.

The operation of the embodiment illustrated in Figure 2 is essentially the same as the operation of the embodiment illustrated in Figure 1. The average bias which is applied between the base electrode 15 and the emitter electrode 20 is determined by the cooperative operation of the two time constant networks. Upon the application of a negative going input signal as illustrated by the wave form 52 which represents a pedestal including a synchronizing pulse and which may be either a horizontal or vertical synchronizing pulse will effect conduction and signal translation through the transistor 17. The static bias existing between these two electrodes is such as to provide conduction only during the presence of this negative going synchronizing pulse or during the presence of negative going impulse noise having an amplitude in excess of the pedestal. During the application of this signal information the diode 25 is biased in a forward direction so as to connect the relatively long time constant network in the circuit during the presence of the signal energy. Upon the termination of the signal energy, however, it may readily be seen that the diode 25 is biased in a reverse direction and affords an open circuit between the base electrode and the long time constant network. Accordingly, the capacitor 24 will be discharged through the resistor 22 which will not effect the bias condition existing between the base electrode 15 and the emitter electrode 20. The bias condition which exists between these two electrodes is accordingly determined by the relatively fast time constant network and the circuit is therefore in condition to properly separate horizontal synchronizing information.

As above discussed in connection with Figure 1 it is readily apparent that it is the switching action provided by the diode 25 which is effective in repairing the circuit for immediately establishing the proper threshold bias for the separation of horizontal synchronizing pulses. If the capacitor 24 effectively remained in the circuit upon the termination of vertical synchronizing pulses or impulse noise signals, the long time required for the discharge of the capacitor 24 through the associated circuitry would maintain a bias between the base electrode 15 and the emitter electrode 20 in such a condition so as to preclude the proper separation of subsequently received horizontal synchronizing pulses. The effect of switching the long time constant network out of the circuit by biasing the diode in a reverse direction upon the absence of input signal energy, avoids this difficulty of blocking the separator for an appreciable period of time.

It is therefore seen that the double time constant network including diode switching to effectively remove the long time constant network from the separator circuit immediately following the termination of input signal energy enables efficient separation of both horizontal and vertical synchronizing signals from a composite video signal and is effective to provide noise immunity so as not to impair the operation of the circuit for the proper separation of horizontal signal information. This is accomplished with a minimum of circuit elements and with stable circuit operation.

I claim:

1. A signal processing circuit comprising in combination, an input circuit for receiving signal information including a first portion having a predetermined recurrent rate and a second portion having a different recurrent rate, a semiconductor device having base, emitter and collector electrodes, means connecting said base and emitter electrodes with said input circuit to define a base-emitter path, a first time constant network intercalated in said base-emitter path, said network responsive to said predetermined recurrent rate, a second time constant network, said last mentioned network responsive to said different recurrent rate, means for selectively coupling said second network with said path in response to signals in said input circuit, and means including an output circuit coupled with said collector electrode for deriving therefrom amplified signal information representative of said first and second portions.

2. In an amplitude discriminatory system for deriving from a composite signal discrete signal energy of different recurrent rates and including a semiconductor device having base, emitter and collector electrodes adapted to provide a base-emitter signal input path, the combination of, a first network connected serially in said base-emitter path, a said network responsive to signal energy of a predetermined recurrent rate, second network, said last mentioned network responsive to signal energy of a lower recurrent rate than said predetermined recurrent rate, and means including a voltage responsive switch connected in series arrangement with said second network and coupled with said base-emitter path, such that said switch is closed during the application of signal energy to said input circuit and open during the absence of said signal energy to render said system effective for the translation of signal energy of each frequency.

3. In an amplitude discriminatory system for deriving from a composite signal discrete signal energy of different recurrent rates and including a semiconductor device having base, emitter and collector electrodes adapted to provide a base-emitter signal input path, the combination of, a first parallel resistor-capacitor network connected serially in said base-emitter path, said network responsive to signal energy of one predetermined rate, a second parallel resistor-capacitor network, said last mentioned network responsive to signal energy of a second predetermined rate, and a means including diode connected in series arrangement with said second network and coupled with said base-emitter path, said diode being poled to receive a forward bias upon the application of signal energy to said input circuit and a reverse bias upon the termination of said signal energy to render said system effective for the translation of signal energy of each of said predetermined rates.

4. An amplitude discriminatory system comprising in combination, an input circuit for receiving an input signal, a transistor having base, emitter and collector electrodes, means including a first frequency selective network responsive to signal energy having a predetermined recurrent rate connected between one of said base and emitter electrodes and said input circuit for providing a bias between said base and emitter electrodes of a magnitude determined by the amplitude of said signal, a second frequency selective network responsive to signal energy of a different recurrent rate, means for connecting said last mentioned network with said one electrode during the application of signal energy to said input circuit, and a signal output circuit connected with said collector electrode.

5. An amplitude discriminatory system comprising in combination, a signal input circuit, a transistor having base, emitter and collector electrodes, means including a first resistor and capacitor connected in parallel arrangement to provide a first frequency selective network responsive to signal energy having a predetermined recurrent rate connected between one of said base and emitter electrodes and said input circuit for providing a bias between said base and emitter electrodes of a magnitude determined by the amplitude of said signal, means including a second resistor and capacitor connected in parallel arrangement to provide a second frequency selective network responsive to signal energy of a different recurrent rate, a diode connected between said second network and said one electrode, said diode being poled to provide a low impedance path between said second network and said one electrode during the application of signal energy to said input circuit, and a signal output circuit connected with said collector electrode.

6. An amplitude discriminatory system comprising in combination, a transistor having base, emitter and collector electrodes, said transistor providing a unilaterally conducting base-emitter path, a signal input circuit connected between said base electrode and signal ground, a first resistor and a first capacitor connected in parallel arrangement between said emitter electrode and said signal ground, said first resistor and first capacitor having a time constant long with respect to a signal of a predetermined recurrent rate, a diode and a second capacitor connected in series arrangement between said emitter electrode and said signal ground, said diode being poled in the same direction as said base-emitter path, a second resistor connected in shunt with said second capacitor, and said second capacitor and said second resistor having a time constant longer than the time constant of said first resistor and first capacitor, a signal output circuit including means for biasing said transistor connected with said collector electrode.

7. An amplitude discriminatory system comprising in combination, a transistor having base, emitter and collector electrodes, means providing a common signal ground point, a signal input circuit referenced with respect to said signal ground, a first resistor and a first capacitor connected in parallel arrangement between said input circuit and said base electrode, said first resistor and first capacitor having a time constant long with respect to a signal of a predetermined recurrent rate, a second resistor and a diode element connected in series arrangement in parallel with said first resistor, said diode element including an anode and a cathode, means connecting said anode with said base electrode, a second capacitor connected in shunt with said second resistor, said second capacitor and said second resistor having a time constant longer than the time constant of said first resistor and first capacitor, means connected for applying a forward bias between said base and emitter electrodes, and means providing a signal output circuit connected with said collector electrode including means for applying a reverse bias between said collector and base electrodes.

8. An amplitude discriminatory system comprising in combination, a transistor having base, emitter and collector electrodes, a signal input circuit connected between said base electrode and signal ground, a first resistor and a first capacitor connected in parallel arrangement between said emitter electrode and said signal ground, said first resistor and first capacitor having a time constant long with respect to a signal of a predetermined recurrent rate, a diode and a second capacitor connected in series arrangement between said emitter electrode and said signal ground, said diode being poled to provide a low impedance path between said emitter electrode and said second capacitor during signal current flow in said first resistor, a second resistor connected in shunt with said second capacitor, and said second capacitor and said second resistor having a time constant longer than the time constant of said first resistor and first capacitor, a signal output circuit including means for biasing said transistor connected with said collector electrode.

9. A signal processing circuit comprising in combination, an input circuit for receiving signal information, a semi-conductor device having first, second and third electrodes, means providing a first resistance-capacitance network having a time constant which is long relative to a cycle of signals of a predetermined rate of recurrence, means connecting said input circuit and said first resistance-capacitance network between said first and second electrodes to define a unidirectionally conductive current path, a second resistance-capacitance network having a time constant longer than that of said first resistance-capacitance network, means including a unidirectionally conductive device for selectively coupling said second resistance-capacitance network with said current path in response to signals in said input circuit, and means providing an output circuit coupled with said third electrode for deriving therefrom amplified signal information.

10. In an amplitude discriminatory system for deriving from a composite signal discrete signal energy of different recurrent rates and including a semi-conductor device having first, second and third electrodes, means providing a first time constant network having a time constant which is long relative to a cycle of signal energy of a predetermined rate connected serially in said base-emitter path, a second time constant network having a time constant longer than that of said first time constant network, and means including a unidirectionally conductive device connecting said second time constant network in parallel with said first time constant network, said unidirectionally conductive device being poled to receive a forward bias in response to charging current for the first time constant network.

11. A synchronizing signal separator for television receivers comprising in combination, a semi-conductor device having first, second and third electrodes, means providing an input circuit for a television signal including recurrent horizontal and vertical synchronizing pulses, a first time constant network including the parallel combination of a resistor and a capacitor having a time constant which is long relative to the period between horizontal synchronizing pulses but short relative to the period between vertical synchronizing pulses, means connecting said first time constant network and said input circuit between said first and second electrodes, a second time constant network including the parallel combination of a resistor and a capacitor having a time constant which is long relative to that of said first time constant network, means including a unidirectionally conductive device connecting said second time constant network in parallel with said first time constant network, said unidirectionally conductive device poled to receive a forward bias in response to charging current flowing through the resistor in said first time constant network, and an output circuit connected between said first and third electrodes.

12. A synchronizing signal separator for television receivers comprising in combination, a semi-conductor device having first, second and third electrodes, means providing an input circuit for a television signal including recurrent horizontal and vertical synchronizing pulses, biasing means for said semi-conductor device including a first time constant network including the parallel combination of a resistor and a capacitor having a time constant which is long relative to the period between horizontal synchronizing pulses but short relative to the period between vertical synchronizing pulses, means connecting said first time constant network and said input circuit in series between said first and second electrodes, a second time constant network including the parallel combination of a resistor and a capacitor having a time constant which is long relative to the period between vertical synchronizing pulses, means including a unidirectionally conductive device connecting said second time constant network in parallel with said first time constant network, said unidirectionally conductive device poled to receive a forward bias in response to charging current flowing through the resistor in said first time constant network, and an output circuit connected between said first and third electrodes.

13. A synchronizing signal separator for television receivers comprising in combination, a transistor having base, emitter and collector electrodes, means providing an input circuit for a television signal including recurrent horizontal and vertical synchronizing pulses connected between said base and emitter electrodes, means providing an output circuit connected between said emitter and collector electrodes, a first time constant network including the parallel combination of a resistor and a capacitor having a time constant which is long relative to the period between horizontal synchronizing pulses but short relative to the period between vertical synchronizing pulses, means connecting said first time constant network in common with said input circuit and said output circuit, a second time constant network including the parallel combination of a resistor and a capacitor having a time constant which is long relative to said first time constant network, and means including a unidirectionally conductive device connecting said second time constant network in parallel with said first time constant network, said unidirectionally conductive device poled to receive a forward bias in response to charging current flowing through the resistor in said first time constant network.

References Cited in the file of this patent

UNITED STATES PATENTS

| | | |
|---|---|---|
| 2,275,930 | Torcheux | Mar. 10, 1942 |
| 2,287,926 | Zepler | June 30, 1942 |
| 2,602,918 | Kretzmer | July 8, 1952 |
| 2,648,725 | Wright et al. | Aug. 11, 1953 |
| 2,717,931 | Duke | Sept. 13, 1955 |

FOREIGN PATENTS

| | | |
|---|---|---|
| 64,537 | Denmark | May 10, 1941 |